United States Patent
Waheed

(10) Patent No.: US 9,948,743 B2
(45) Date of Patent: Apr. 17, 2018

(54) MANAGING MEMORY USAGE IN SERVER SYSTEMS

(71) Applicant: salesforce.com, inc., San Francisco, CA (US)

(72) Inventor: Abdul Waheed, Santa Clara, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 115 days.

(21) Appl. No.: 14/811,422

(22) Filed: Jul. 28, 2015

(65) Prior Publication Data

US 2017/0034297 A1 Feb. 2, 2017

(51) Int. Cl.
*G06F 15/167* (2006.01)
*H04L 29/08* (2006.01)
*H04L 12/26* (2006.01)

(52) U.S. Cl.
CPC .......... *H04L 67/2842* (2013.01); *H04L 43/10* (2013.01); *H04L 67/1095* (2013.01)

(58) Field of Classification Search
CPC .. H04L 67/2842; H04L 67/1095; H04L 43/10
USPC ........................................................ 709/213
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Formukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |

(Continued)

*Primary Examiner* — Wing F Chan
*Assistant Examiner* — Joseph Maniwang
(74) *Attorney, Agent, or Firm* — Schwabe Williamson & Wyatt

(57) ABSTRACT

A memory manager reduces the impact of memory clean-up operations on server performance. The memory manager monitors local memory usage and other resource usage by the server, such as processor, storage, and network usage. When moderately high memory usage is detected, the memory manager performs memory clean-up operations during relatively low processor, storage, and network usage to reduce the impact of the clean-up operations on server performance. When excessively high memory usage is detected, the memory manager more aggressively cleans-up local memory independently of processor, storage, and network usage.

21 Claims, 7 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaver et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0117540 A1* | 6/2004 | Hahn ................... G06F 9/5083 711/100 |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0221184 A1* | 11/2004 | Hellerstein ............ G06Q 10/04 713/300 |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0005926 A1* | 1/2007 | Kim ................... G06F 12/0253 711/170 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla et al. |
| 2012/0042218 A1 | 2/2012 | Cinarkaya |

(56) References Cited

U.S. PATENT DOCUMENTS

| | | |
|---|---|---|
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0215459 A1* | 7/2014 | Tsirkin ............... G06F 9/45558 718/1 |
| 2014/0359537 A1 | 12/2014 | Jakobson et al. |

* cited by examiner

MANAGING MEMORY USAGE IN SERVER SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to managing memory in server systems.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Cloud computing infrastructures include servers with a mix of input/output (I/O) and compute intensive workloads. These servers are typically based on 64-bit processors and operating systems with a large physical address space. The servers may have many gigabytes (GB s) of random access memory (RAM). Linux® kernel memory management and other operating systems have inherent issues with these server and workload mixes.

For example, large swaths of free memory are taken up by page caches for intensive block I/O operations. Cache memory is not freed up by default and continues to accumulate cached pages until the server runs out of memory. Unavailable free pages may cause the server to use swap space that can degrade server performance. Under high memory pressure conditions, the operating system kernel may evict least used code pages that may be critical for a user application, which will likely result in further reducing server performance.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
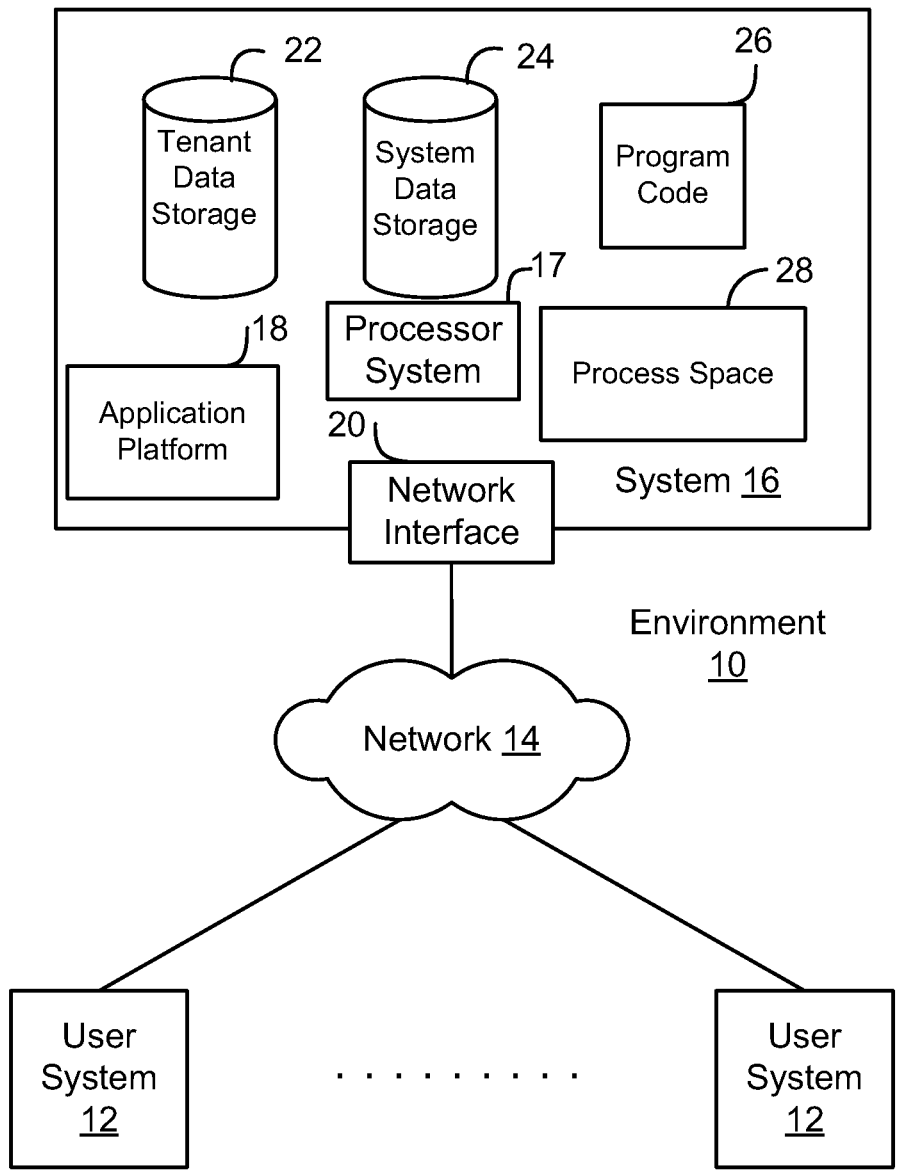
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations.

These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
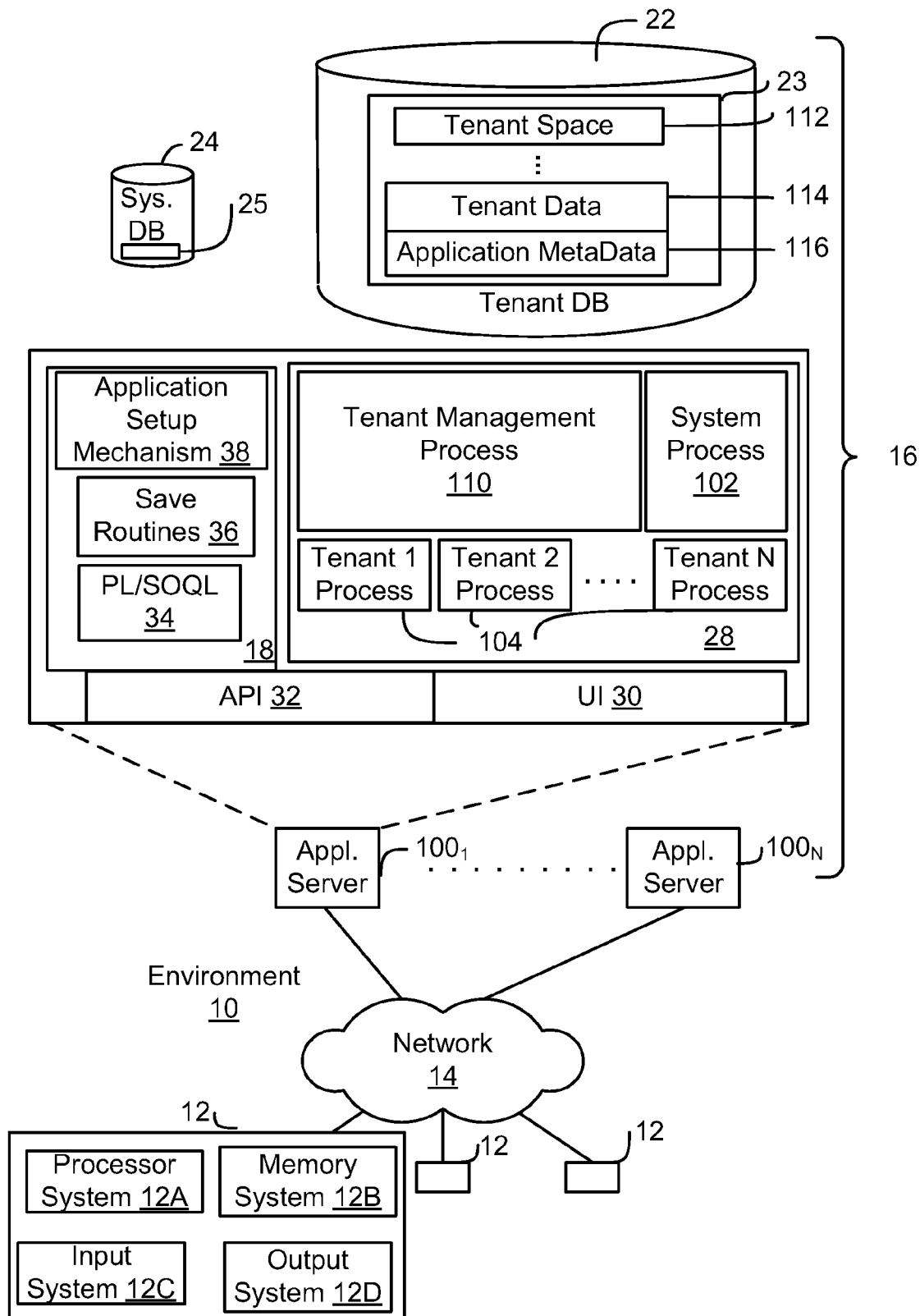
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Managing Memory Usage in Server Systems

A memory manager reduces the impact of memory clean-up operations on server performance. The memory manager monitors memory usage and other system resource usage in a server, such as processor usage, storage device usage, and network usage. When moderate memory usage is detected, the memory manger performs memory clean-up operations during relatively low processor, storage, and network usage to reduce the impact of the clean-up operations on server performance. When high memory usage is detected, the memory manager more aggressively cleans-up memory independently of processor, storage, and network usage.

Figure 2:
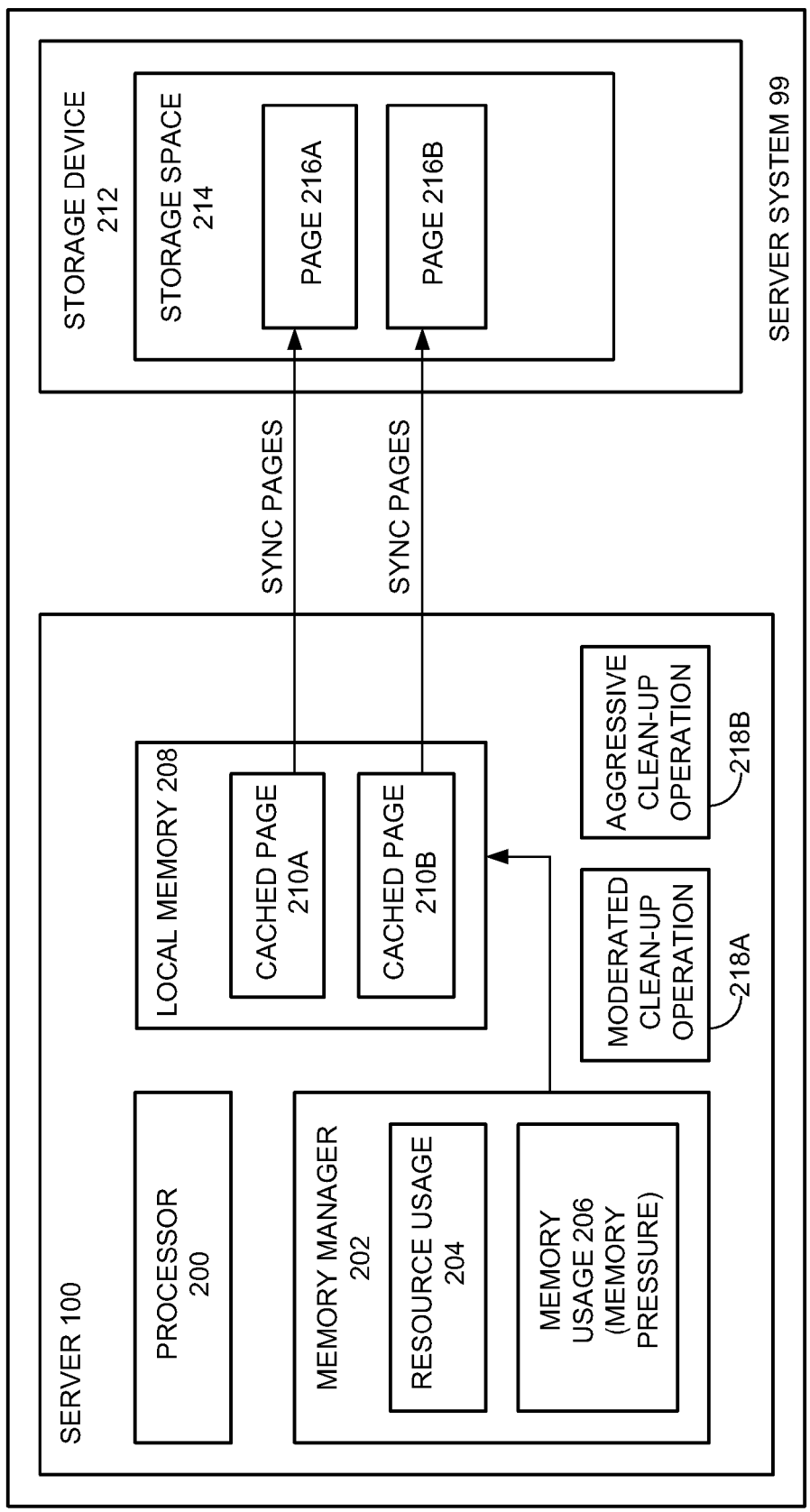
FIG. 2 shows an example memory manager accordingly to some implementations.

FIG. 2 shows an example server system 99 that in some examples includes some of the components of system 16 described above. A server 100 within server system 99 includes a processor 200, local memory 208, and a memory manager 202. Processor 200 may include a central processing unit (CPU) and/or any other combination of processing devices used by server 100. Local memory 208 consists of random access memory (RAM); however, it can use storage devices such as flash memory, disk, or RAID as an extension through swapping.

A storage device 212 may consist of storage space 214 that may include any combination of disk, flash, and/or RAID based storage that are typically slower than RAM in local memory 208. Local memory 208 is shown operating within server 100 and storage space 214 is shown operating within storage device 212. However, any data or code related memory pages may be located in a combination of local memory 208 and/or storage space 214, which in turn may be located within server 100 through I/O devices attached via bus or network connections.

In one typical example, the amount of storage space 214 is substantially larger than the amount of local memory 208. For example, server 100 may contain multiple gigabytes of local memory 208 and storage device 212 may contain multiple terabytes of storage space 214. Of course, this is just one example and server system 99 may include any amount of local memory 208 and/or storage space 214.

Processor 200 may use local memory 208 to run application processes and store data. For instance, processor 200 may receive data access requests from user-end systems 12 described above in FIGS. 1A and 1B. Processor 200 writes and reads pages of data 216 associated with the user requests to and from storage space 214 and then may store the data as cached pages 210 in local memory 208. Processor 200 may read and store block data pages 210 and 216 in $2^2 \times 1024$ byte (KB) increments. For example, pages 210 and 216 may be 4 KB, 8 KB, 16 KB, etc., contiguous chunks of memory.

The amount of local memory 208 used as page cache may be variable. For example, server 100 may use more local memory 208 for storing cached pages 210 for increased numbers and/or sizes of data requests from the user devices. Server 100 may run into problems if too much local memory 208 is used for storing cached pages 210. In such scenarios, it is possible that processor 200 may spend more time searching for available space in local memory 208 and/or increase usage of slower storage space 214 as swap. Server 100 also may need to defragment local memory 208 and/or reboot if an out of memory (OOM) condition is detected. All of these conditions may substantially slowdown or impair application processes running on server 100.

Memory manager 202 monitors resource usage 204 in server 100. Resource usage 204 may include any metric indicating a likelihood of slowing down performance of server 100. For example, metrics for resource usage 204 may include processor usage, storage device usage, and/or network usage.

Memory manager also may monitor memory usage 206 of local memory 208. Memory usage 206 may include any metric that indicates a measure of excessive memory allocation overhead, which is a condition commonly referred to as memory pressure on local memory 208. For example, metrics for memory usage 206 may include an amount of local memory 208 used for storing cached pages 210. Other metrics for memory usage 206 may include an amount of memory page scans, page swaps, page steals, page compaction, and/or virtual memory usage. Resource usage 204 and memory usage 206 are described in more detail below.

Memory manager 202 may initiate a moderated clean-up operation 218A for freeing up space in local memory 208 based on a moderate level of memory usage 206. For example, memory manager 202 may detect a particular percentage of local memory 208 used for storing cached pages 210. To prevent local memory 208 from running out of space, memory manager 202 may synchronize cached pages 210 with corresponding pages 216 in storage space 214 and free up space in local memory 208 that was previously used by the now synchronized cached pages 210. Memory manager 202 also may rate limit moderated clean-up operation 218A to once every few minutes to prevent unnecessary memory usage.

Memory manager 202 also may initiate moderated clean-up operation 218A during low or relatively moderate levels of resource usage 204. Waiting for low levels of resource usage 204 may prevent clean-up operation 218A from slowing down other processes operating in server 100. Moderated clean-up operation 218A may provide more efficient memory management for large data operations that frequently fill up local memory 208 with cached pages 210.

Memory manager 202 may initiate a more aggressive clean-up operation 218B when memory usage 206 indicates high memory pressure. During high levels of memory usage 206, memory manager 202 may free up space in local memory 208 independently of resource usage 204. Memory manager 202 may determine the high memory pressure state based on other metrics identified in memory usage 206, such as high memory scan frequency, high page steal frequency, low virtual memory efficiency, and/or high swap usage.

Memory manager 202 anticipates high memory conditions based on memory usage 206 instead of simply waiting for space to run out in local memory 208. Memory manager 202 then either moderately or aggressively frees up local memory 208 in clean-up operations 218A or 218B, respectively, avoiding an OOM or memory defragment operation that may significantly slow down or stop application processes, or result in system failures. Memory manager 202 may provide substantial performance benefits for servers that run compute and I/O intensive workloads, such as databases, indexing and search, and big data analytics.

Figure 3:
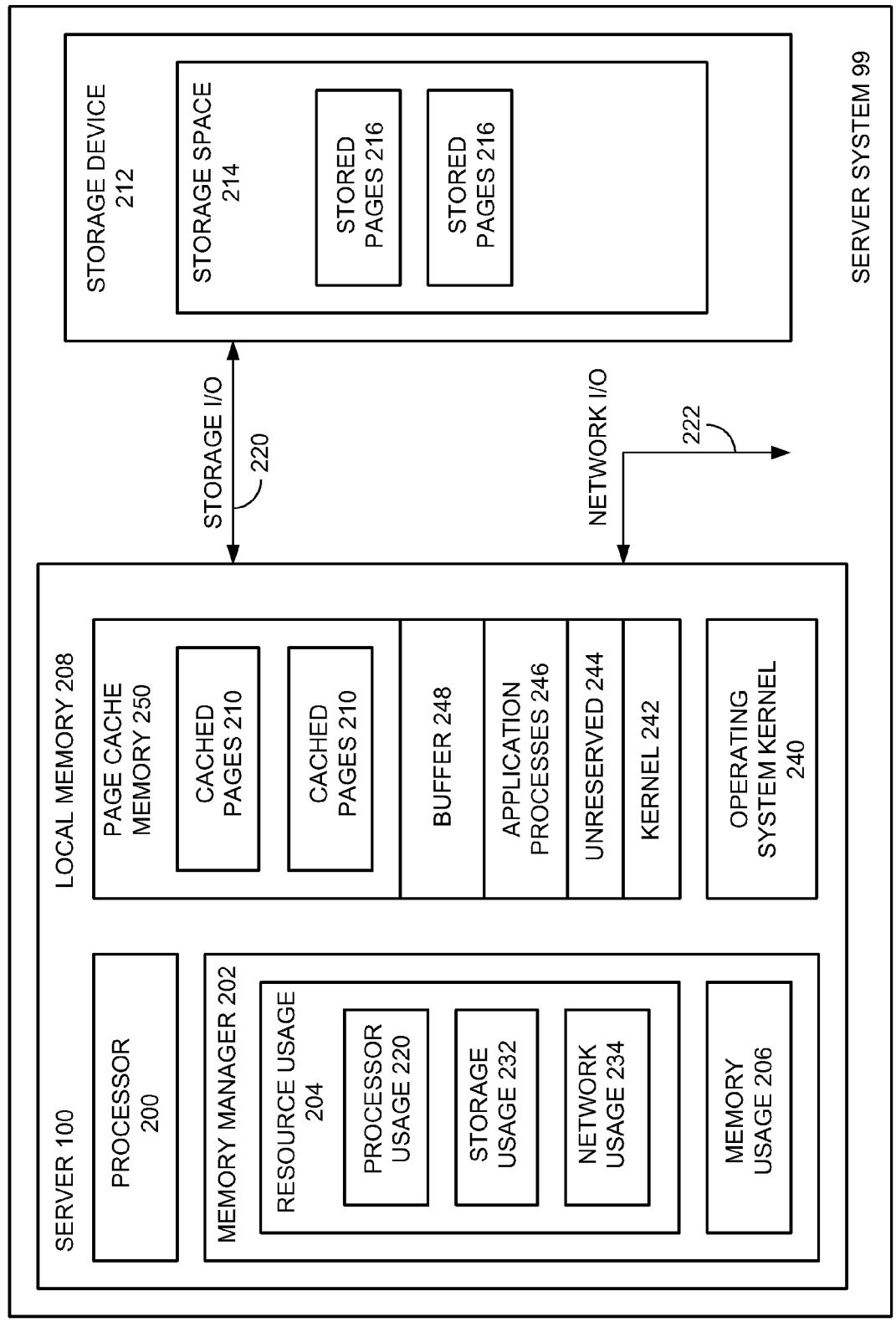
FIG. 3 shows the example memory manager of FIG. 2 in more detail.

FIG. 3 shows server system 99 in more detail. An operating system kernel 240 may use different portions of local memory 208 for different processes. Operating system 240 may use a portion of local memory 208 as kernel memory 242 for general system management. Operating system 240 may use unreserved memory 244 for storing application processes' stacks, heaps, areas, etc. Kernel may use a buffer memory section 248 for buffering packets during network I/O operations 222.

As mentioned above, server 100 may dynamically vary the size of page cache memory 250 used for storing cached pages 210. For example, server 100 may receive requests from user devices. Server 100 may perform storage I/O operations 220 with storage device 212 to store or retrieve blocks of data (pages) 216 associated with the requests. The data read from pages 216 is cached in page cache memory 250 as cached pages 210. More storage I/O operations 220 between server 100 and storage device 212 may increase the amount of cached pages 210 and associated size of page cache memory 250.

Performance of server 100 may degrade or server 100 may crash if the amount of page cache memory 250 gets too large. Memory manager 202 not only manages the size of page cache memory 250 but also performs moderated clean-up operation 218A described in FIG. 2 during low levels of resource usage 204 to reduce the chances of the clean-up operations slowing down application processes running on server 100.

As also mentioned above, memory manager 202 initiates the moderated clean-up operation based on a first level of memory usage 206 and initiates the more aggressive clean-up operation 218B described in FIG. 2 based on a second higher level of memory usage 206. Memory manager 202 initiates the more aggressive clean-up operation independently of resource usage 204.

In one example, resource usage 204 includes processor usage 220 associated with processor 200, storage usage 232 associated with storage I/O operations 220, and/or network usage 234 associated with network I/O operations 222. The following are some example metrics memory manager 202 may use to determine resource usage 204 and/or memory usage 206.

CPU usage: A percentage of used or available processor 200 time.

Storage I/O usage: The percentage of time spent for storage I/O operations 220 between server 100 and storage device 212. Large usage of swap space in storage space 214 may indicate low available cache memory 250 in local memory 208.

Total memory: Total amount of space in local memory 208.

Used memory: Amount of used space in local memory 208.

Free memory: Difference of total and used memory in local memory 208.

Cache memory: Amount of page cache memory 250 in local memory 208 used for storing cached pages 210.

Buffered memory: Amount of memory 248 used for buffering network packets during network I/O operations 222.

Number of dirty pages: Number of cached pages 210 with added or modified data, which may differ from the data in associated stored pages 216. Also indicates how much data in cached pages 210 needs to be written/synchronized with stored pages 216 in storage device 212. In other words, the number of dirty pages provides an indication of how long clean-up operations may take.

Number of free pages: Number of pages or blocks of memory in page cache memory 250 available for storing cached pages 210.

Number of evictable pages: Number of cached pages 210 with no added or modified data (non-dirty pages) that can be added to free pages without first being synchronized with stored pages 216.

Swapping: Swapping may include swapping program code or data pages between local memory 208 and storage space 214. High swapping frequency may correspond to an overload condition in local memory 208 and indicates the level of performance degradation of server 100 due to the overload condition. In one example, memory manager 202 may determine the swapping metric based on the number of reads and writes between processor 200 and swap partition of storage device 212.

Pages in/out from/to swap: Pages are moved from storage device 212 to local memory 208 when a program code and/or data is being loaded at a startup time. Kernel memory management may have to transfer some of these pages to swap partition of the storage device when the server system starts running into memory pressure. A high page swap rate may indicate local memory 208 is running out of space.

Rate of page scans: Operating system 240 may scan local memory 208 for free space. An increase in the rate of page scans may indicate that local memory 208 is full or near full.

Rate of page steals: Moves non-dirty cached pages 210 into a free memory pool. No synchronization is needed with associated storage pages 216 since cached pages 210 have not been modified. An increased rate of page steals may indicate local memory 208 is full or nearly full.

Virtual memory usage/efficiency: The operating system may use slower storage space 214 as virtual memory for local memory 208. Virtual memory usage may indicate that local memory 208 is full and indicates a decline in server performance. Virtual memory efficiency indicates the efficiency of page steals. If operating system 240 is 100% successful with page steals, virtual memory efficiency is 100%. If operating system 240 cannot find cached pages 210 for page steals, virtual memory efficiency is 0%. Low virtual memory efficiency may indicate a high memory pressure condition since there are few non-dirty cached pages 210 for moving into the free memory pool.

In one example, memory manager 202 may operate within a kernel operating system space or operate within user space. For example, memory manager 202 may be loaded as a module within a Linux® kernel. In another example, memory manager 202 may operate as a script in user space that includes root privileges. In another example, memory manager 202 may operate as a module within a Java® virtual machine (JVM). Operating system 240 also may run multiple control groups that each separately partition portions of local memory 208. Each control group may include a separate module that operates as a separate memory manager 202.

Figure 4:
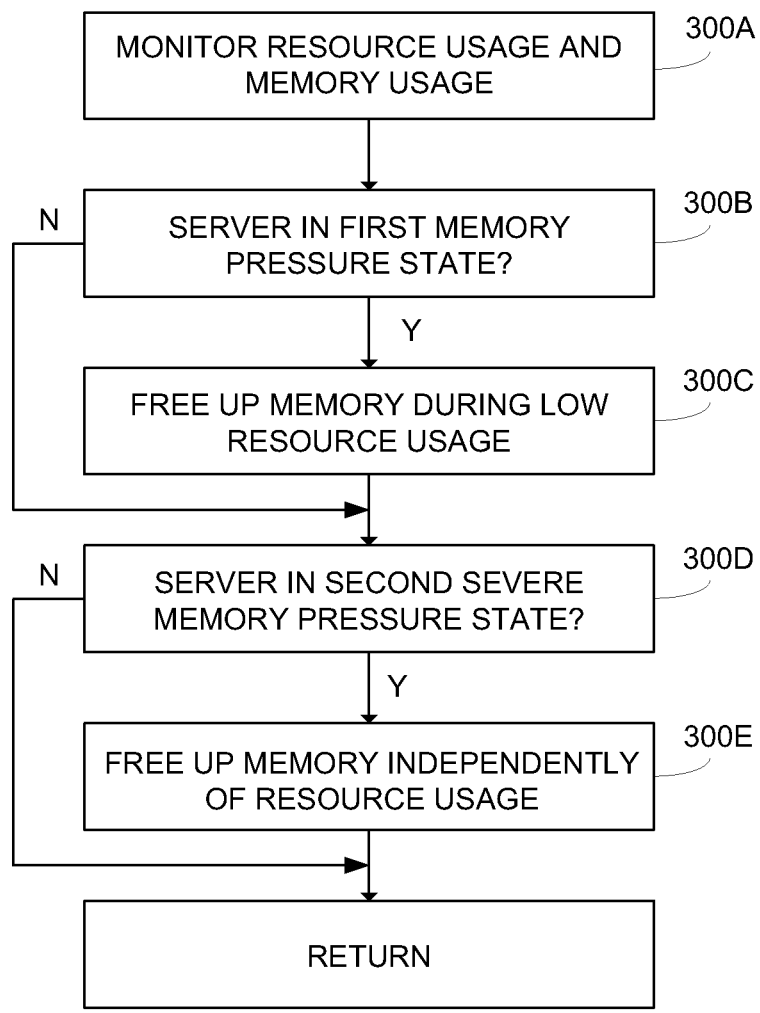
FIG. 4 shows an example process for managing memory.

FIG. 4 depicts one example memory management process. In operation 300A, the memory manager monitors memory usage, such as metrics that indicate the memory pressure on the local memory. The memory manager also monitors resource usage, such as processor usage, storage I/O operations, and network I/O operations.

In operation 300B, the memory manager detects a first memory pressure state. For example, the server may determine that a certain threshold percentage of local memory is currently used as page cache memory. During the first memory pressure state, the memory manager in operation 300C may free up space in local memory during low or moderate resource usage. For example, the memory manager may initiate a clean-up operation when processor bandwidth is low, the number of storage I/O operations is low, and/or the number of network I/O operations is low.

In operation 300D, the memory manager may detect a second more severe memory pressure state. The more severe memory pressure state may indicate the local memory is almost out of memory. For example, the memory manager may detect a high number of page scans, a high number of page steals, and/or a low virtual memory efficiency.

In operation 300E, based on the second more severe memory pressure state, the memory manager may initiate a more aggressive clean-up operation that frees up local memory independently of resource usage. For example, the memory manager may start syncing cached pages with the storage device independently of resource usage until a specified percentage of the local memory is freed up.

Figure 5:
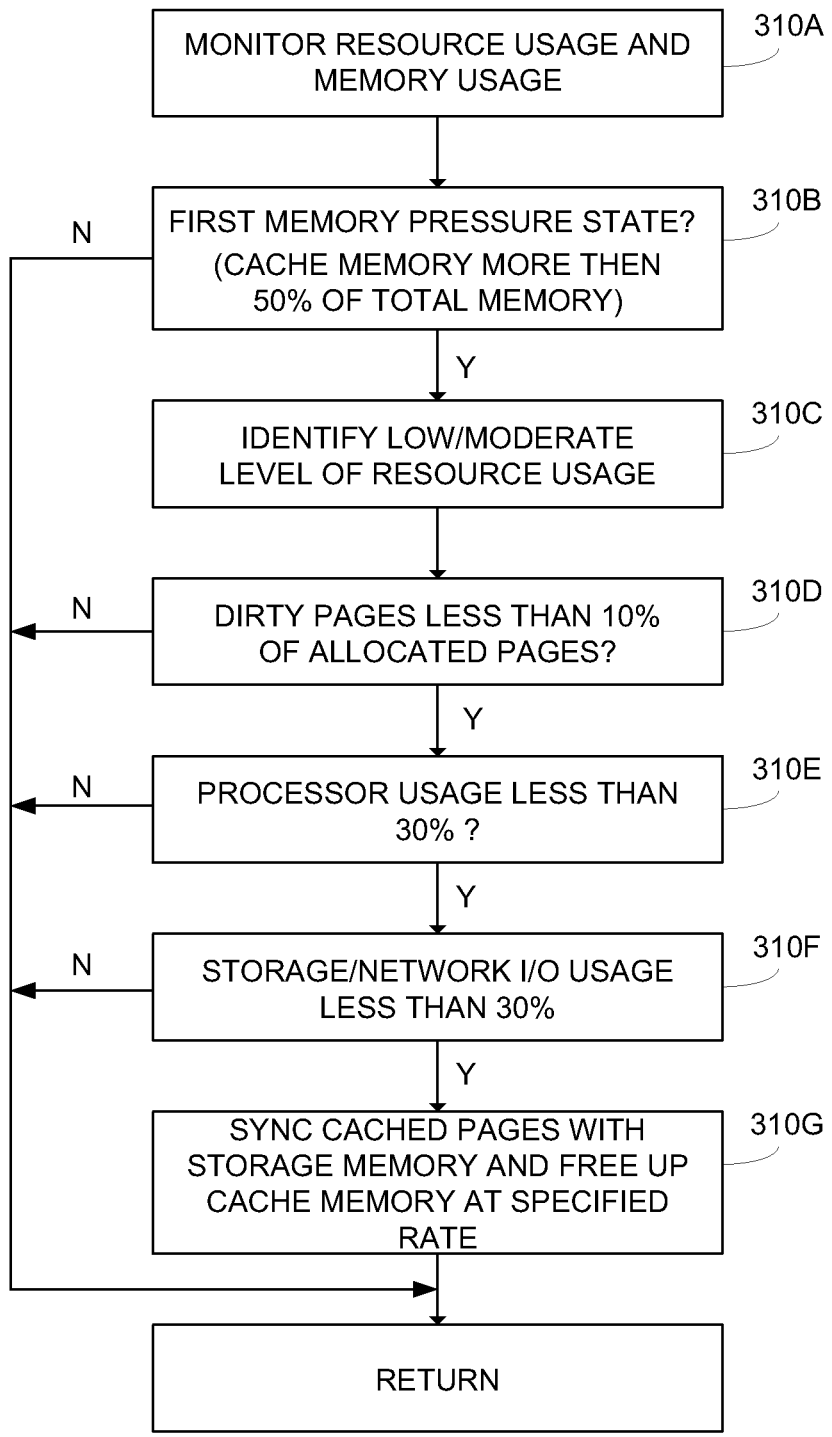
FIG. 5 shows an example clean-up process for a low or moderate memory pressure state.

FIG. 5 shows an example memory clean-up process for a low or moderate memory pressure state. In operation 310A, the memory manager monitors resource usage and memory usage. In operation 310B, the memory manager detects the first memory pressure state. In this example, the first memory pressure state is based on an amount of local memory used for storing cached pages. For example, the memory manager may determine 50% or more of the local memory is currently used as page cache memory.

The first memory pressure state may indicate that local memory is starting to fill-up and has some lower degree of memory pressure but also may indicate that an aggressive clean-up operation is not yet necessary. In operation 310C, the memory manager waits for a low or moderate resource usage before initiating the moderate memory clean-up operation.

For example, in operation 310D, the memory manager determines if the number of dirty pages in local memory is less than some percentage, such as 10%. The percentage of dirty pages may reflect the amount of processing needed for the clean-up operation. To reduce impact of the clean-up operation on server performance, the memory manager may wait for the number of dirty pages to drop to some level with a relatively short associated clean-up time.

Operation 310E may identify processor usage less than some percentage, such as 30%. This may indicate the processor has available cycles for the clean-up operation. Operation 310F may determine if storage I/O usage and/or network I/O usage is less than some percentage, such as 30%. This may indicate that clean-up operations will not likely slow down storage and/or network operations.

If operations 310D, 310E, and/or 310F indicate relatively low or moderate resource usage, the memory manager in operation 310G syncs cached pages in the local memory with the corresponding pages in the storage device and frees up the associated space in local memory.

The memory manager may delay clean-up operation 310G when any combination of metrics identified in operations 310D, 310E, and/or 310F indicate a higher level of resource usage. Thus, the memory manager selectively initiates the clean-up operation to reduce the likelihood of clean-up operation 310G degrading the performance of application processes.

The memory manager may perform clean-up operation 310G at a specified rate. For example, the memory manager may rate limit clean-up operation 310G to once per some specified time period, such as once every several minutes. Rate limiting further prevents some possibly unnecessary clean-up operations 310G from negatively impacting the performance of application processes.

Figure 6:
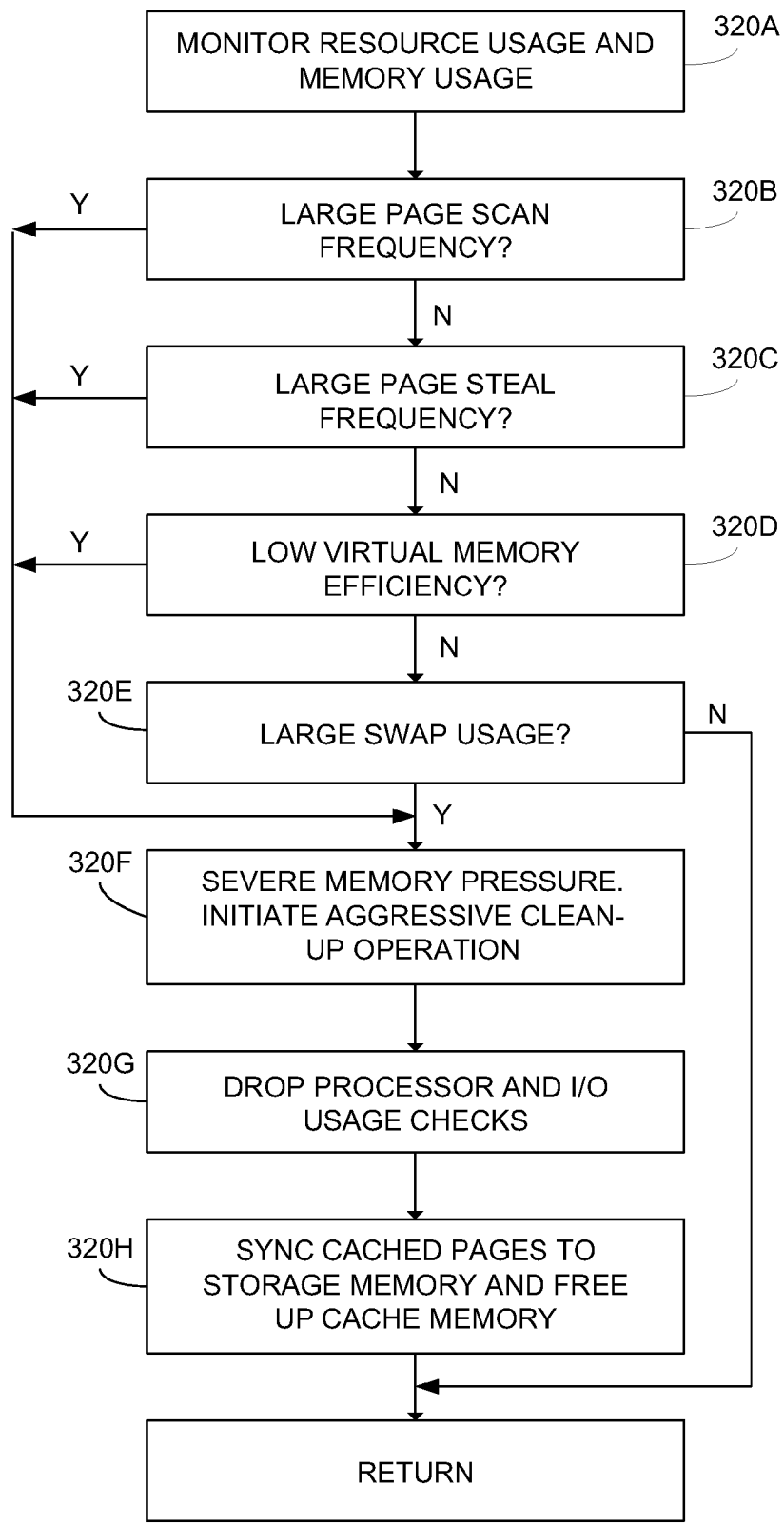
FIG. 6 shows an example clean-up process for a high memory pressure state.

FIG. 6 depicts an example memory clean-up operation for a high memory pressure state. A high memory pressure state may indicate little or no available local memory and may cause the memory manager to initiate a more aggressive clean-up operation independently of resource usage. Although a more aggressive clean-up operation may cause a degradation in server performance, it may prevent a severe system slow down or crash.

In operation 320A, the memory manager monitors resource usage and memory usage. In operation 320B, the memory manager may detect a large page scan frequency. For example, the operating system may increase page scanning when the local memory starts running out of space.

In operation 320C, the memory manager may detect a large page steal frequency indicating that local memory is full or nearly full. For example, the operating system may need to free up pages at a high rate due to a shortage of space in local memory.

In operation 320D, the memory manager may detect low virtual memory efficiency, which also indicates high local memory usage. For example, low virtual memory efficiency may indicate a low success with the page steals in operation 320C. Operation 320D also may detect high virtual memory usage indicating the operating system is using the slower storage device for running some application processes.

In operation 320E, the memory manager may detect a large page swap frequency, which indicates that local memory is full or nearly full.

In operation 320F, the memory manager determines severe pressure in the local memory based on any combination of metrics identified in operations 320B-320E. In operation 320G, the memory manager may stop monitoring processor usage, storage I/O usage, and network I/O usage to preserve resource bandwidth.

In operation 320H, the memory manager may synchronize the cached pages with corresponding pages in the storage device to free up additional space in the local memory. Since memory pressure identified in operation 320F is severe, the memory manager may conduct clean-up operation 320H independently of resource usage as described above in FIG. 5. In other words, the memory manager may perform a more aggressive clean-up operation 320H to prevent the server from completely running out of local memory, further slowing down, and/or crashing.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having a server providing a front end for an on-demand database service capable of supporting multiple tenants, the present implementations are not limited to multi-tenant databases or deployment on servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method for a server system to manage memory in a server, the method comprising the steps of:
monitoring, by the server system, resource usage of a processor and a storage device;
monitoring, by the server system, memory usage for a local memory by the server;
initializing a first clean-up operation that rate limits synchronizing cached pages in the local memory with pages in the storage device to increase the amount of available space in the local memory based on the resource usage and a first level of the memory usage; and
initializing a second clean-up operation that does not rate limit synchronizing the cached pages in the local memory with the pages in the storage device, and independently of the resource usage based on a second level of the memory usage higher than the first level of the memory usage.

2. The method of claim 1, further comprising determining the first level of the memory usage based on a percentage of the local memory storing the cached pages.

3. The method of claim 1, further comprising determining the resource usage based on:
a metric of usage of the processor; and
a measure of storage device input/output (I/O) operations and network I/O operations by the processor.

4. The method of claim 3, further comprising determining the resource usage based on a number of the cached pages that need to be synchronized with the pages in the storage device.

5. The method of claim 1, further comprising determining the second level of the memory usage based on:
a scan frequency for the cached pages;
a page steal frequency for converting the cached pages into available space in the local memory; or
a measure of swapping of data between the local memory and the storage device.

6. The method of claim 1, further comprising discontinuing the monitoring of at least some of the resource usage during the second level of the memory usage.

7. The method of claim 1, further comprising using a module within a kernel space or user space of the server to monitor the resource usage, monitor the memory usage, and initiate the synchronization of the cached pages.

8. The method of claim 1, further comprising:
estimating an amount of time required to synchronize the cached pages in the local memory with the pages in the storage device; and
synchronizing the cached pages in the local memory with the pages in the storage device based on the estimated amount of time.

9. The method of claim 1, further comprising determining the second level of the memory usage based on a virtual memory usage and/or a virtual memory efficiency of the storage device as local memory.

10. The method of claim 1 including:
detecting when the memory usage is at the first level; and
while the memory usage is at the first level, limiting memory clean-up operations to reduce an impact of the clean-up operations on server performance.

11. The method of claim 1 including:
detecting when the memory usage is at the second level; and while the memory usage is at the second level, initializing the second clean-up operation without regard to an impact of the clean-up operation on resource usage and server performance.

12. A server system, comprising:
a server including a processor and local memory;
a storage device; and
one or more stored sequences of instructions, which, when executed by the processor, cause the processor to carry out the steps of:
monitoring local memory usage, processor usage, and storage device usage by the server;
identifying a first memory pressure state for the local memory based on a first level of the local memory usage;
conducting a first clean-up operation for the local memory during the first memory pressure state based on the processor usage and the storage device usage;
identifying a second memory pressure state for the local memory based on a second level of the local memory usage higher than the first level of the local memory usage;
conducting a second clean-up operation during the second memory pressure state independently of the processor usage and the storage device usage;
rate limiting the first clean-up operation during a specified time period; and
not rate limiting the second clean-up operation.

13. The server system of claim 12, wherein the instructions further cause the processor to carry out the steps of:
monitoring network usage by the server; and
conducting the first clean-up operation based on the network usage; and
conducting the second clean-up operation independently of the network usage.

14. The server system of claim 12, wherein the instructions further cause the processor to carry out the steps of identifying the first memory pressure state based on an amount of the local memory used for storing the cached pages.

15. The server system of claim 14, wherein the instructions further cause the processor to carry out the steps of identifying the second memory pressure state based on:
a frequency of page scans in the local memory;
a frequency of converting cached pages in the local memory into available memory space; and/or
an amount of data swapping between the local memory and the storage device.

16. The server system of claim 12, wherein the instructions further cause the processor to carry out the steps of:
identifying a percentage of dirty pages in the local memory with modified data; and
deferring the first clean-up operation until the percentage of dirty pages drops to a predetermined level.

17. The server system of claim 12, wherein the instructions further cause the processor to carry out the steps of conducting the first clean-up operation and the second clean-up operation by syncing cached pages in the local memory with associated pages in the storage device and invalidating the cached pages in the local memory.

18. A computer program stored on a non-transitory computer-readable medium for a server system, the computer program comprising a set of instructions operable to:
monitor resource usage by a server;
monitor memory usage of a local memory by the server;
conduct a first clean-up operation for the local memory based on a first level of the memory usage;
initiate the first clean-up operation based on the resource usage;
conduct a second clean-up operation for the local memory based on a second level of the memory usage larger than the first level of the memory usage;
initiate the second clean-up operation independently of the resource usage;
rate limit the first clean-up operation during a specified time period; and
not rate limit the second clean-up operation.

19. The computer program of claim 18, including instructions operable to identify the first level of the memory usage based on an amount of the local memory used as page cache memory.

20. The computer program of claim 19, including instructions operable to identify the second level of the memory usage based on scanning and swapping operations for the local memory.

21. The computer program of claim 18, including instructions operable to determine the resource usage based on usage of a processor in the server, an amount of storage operations by the server with disk memory, and an amount of packet operations by the server over a network.

* * * * *